April 15, 1952 W. C. ROE ET AL 2,593,347
TRICYCLE DRIVE MECHANISM AND FRAME THEREFOR
Filed July 25, 1949 3 Sheets-Sheet 2

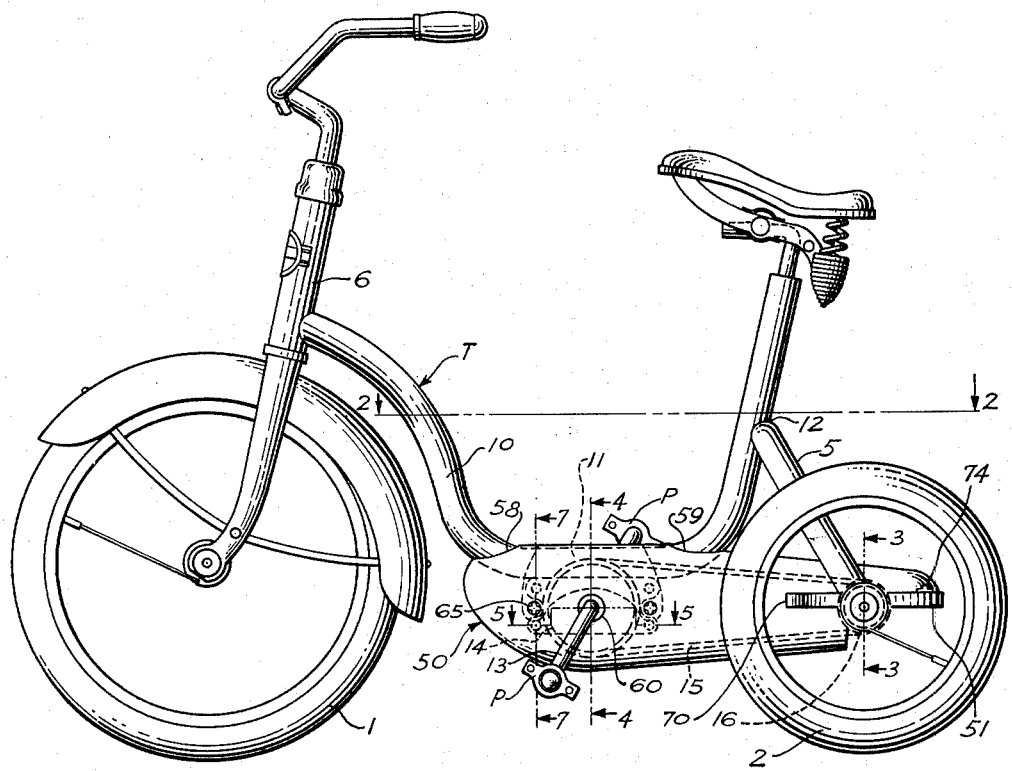

INVENTOR.
WILLIAM C. ROE
AND
ROBERT G. NIGHTINGALE
BY

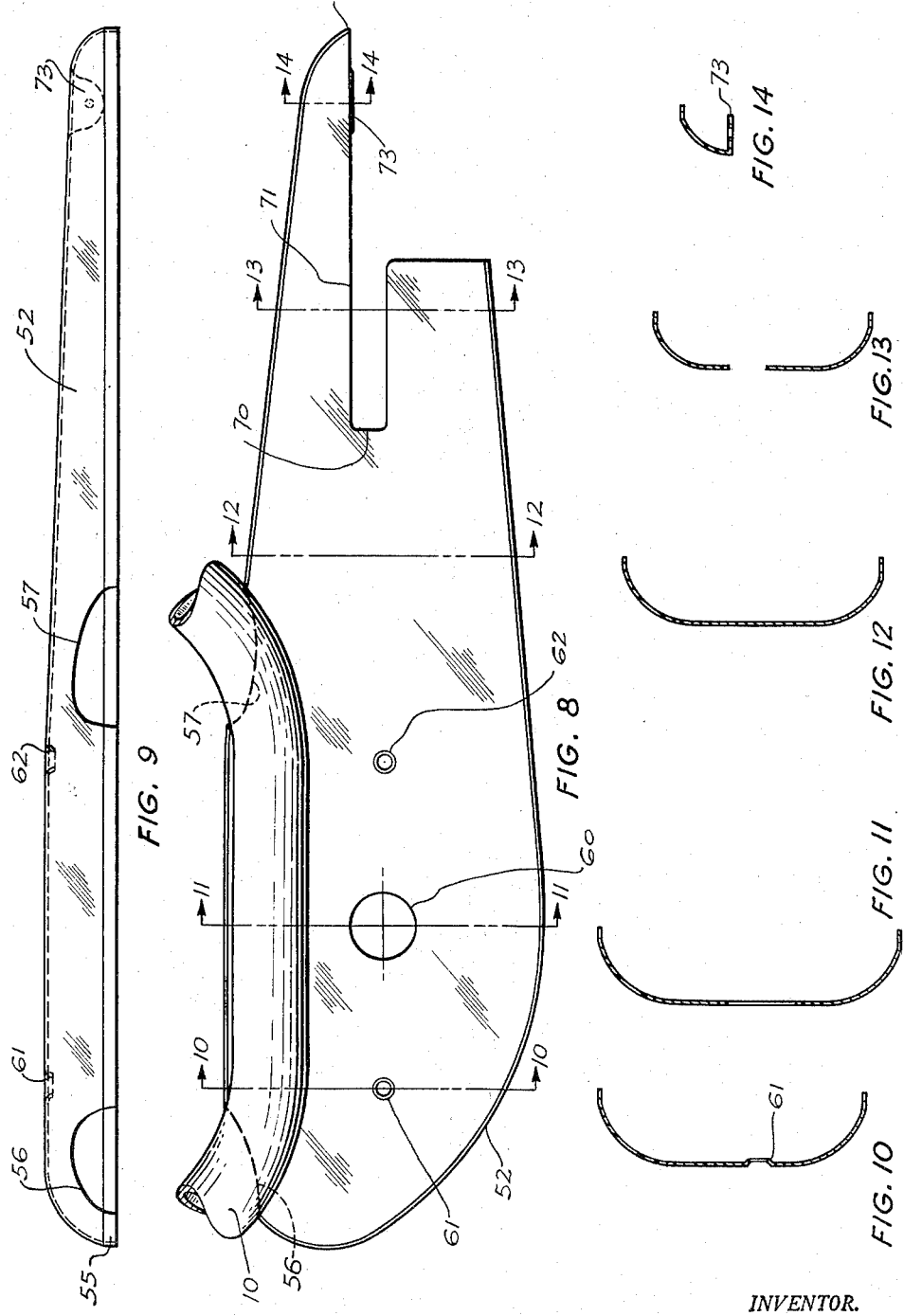

Patented Apr. 15, 1952

2,593,347

UNITED STATES PATENT OFFICE 2,593,347

TRICYCLE DRIVE MECHANISM AND FRAME THEREFOR

William C. Roe and Robert G. Nightingale, Elyria, Ohio, assignors to The Colson Corporation, Elyria, Ohio, a corporation of Ohio Application July 25, 1949, Serial No. 106,556

18 Claims. (Cl. 280—261)

This invention relates to tricycle construction and driving mechanism and more particularly to an integrated frame, drive mechanism and guard assembly for a tricycle or similar vehicle.

It is among the objects of our invention to provide an improved tricycle of enhanced safety, appearance, utility and convenience. More particularly an object is to lower the backbone and chain guard to permit a child to more easily mount the vehicle, to strengthen the structure including the parts that the child uses, to completely guard the driving chain and remove it from possible deleterious contact with the child, to centralize the drive and guard whereby to remove skew loads from the latter when stepped upon and to align the driving sprocket between the crank bearings symmetrically of the crank and frame.

Other objects include the provision of a compact and sturdy crankshaft bearing housing and assembly and the association thereof with the backbone of the vehicle in a manner to facilitate adjustment of the driving chain and to strengthen the backbone of the vehicle. Another object is to provide an inherently safe and self-guarding relationship between the vehicle frame and the driving sprocket and chain, and to provide a chain guard complementing and extending the protection afforded by the frame to portions not specifically guarded thereby.

Figure 6:
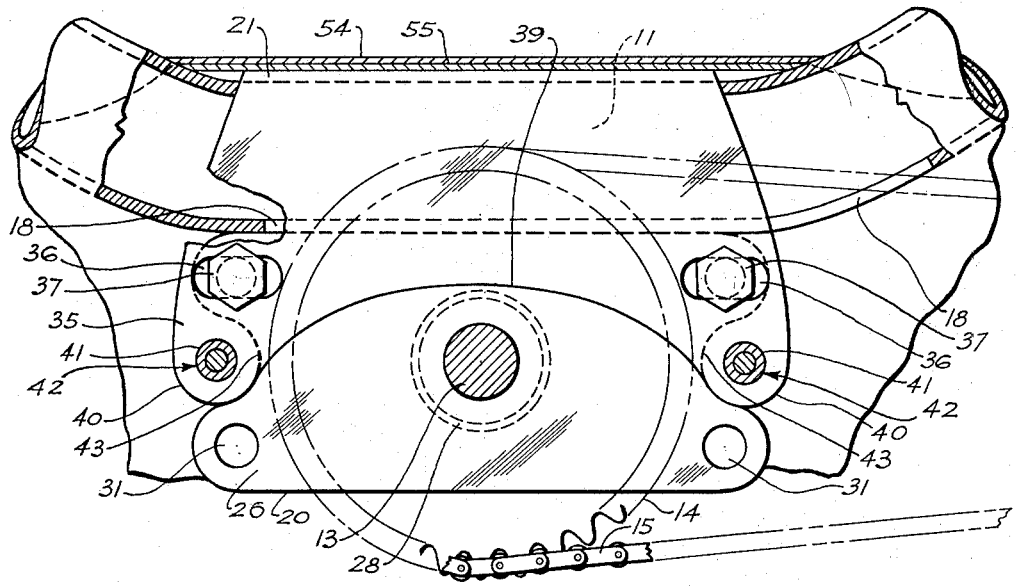
Figure 7:
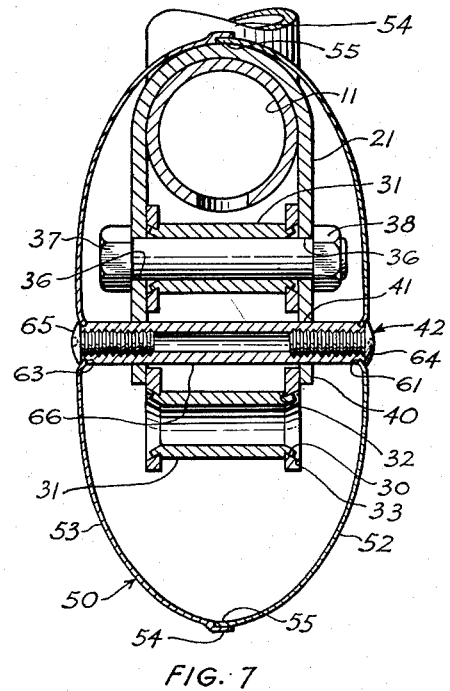
Figure 5:
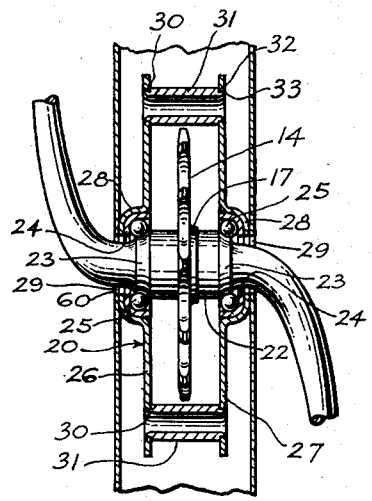

Other objects and advantages will appear in the following description of a preferred form of our invention, reference being had to the accompanying drawings in which Figure 1 is a side elevation of a tricycle embodying my invention; Figure 2 is a horizontal sectional view taken along the plane of the line 2—2 of Figure 1 showing a top plan view of the exterior of the driving mechanism; Figure 3 is an enlarged partially fragmentary section taken along the line 3—3 of Figure 1 through the driven axle of the vehicle; Figure 4 is an enlarged vertical section taken along the line 4—4 of Figure 1 through the axis of the crank and driving sprocket; Figure 5 is an enlarged broken horizontal section taken along the broken line 5—5 of Figure 1; Figure 6 is a side elevation partly in section of the bearing housing drive and backbone assembly in larger scale; Figure 7 is an enlarged vertical section taken along the line 7—7 of Figure 1; Figure 8 is an enlarged side elevation of the right half of the drive and chain guard; Figure 9 is a top plan view of the right half of the drive and chain guard, and Figures 10 to 14 inclusive are transverse sections along the lines 10—10 to 14—14 inclusive of Figure 8.

The preferred form of our invention is shown in the environment of the tricycle T having the conventional swivelling front wheel 1 with conventional swivelled fork, head and handle bars and a pair of rear wheels 2 supported on and driven by a live axle 3, the latter being journalled in bearings 4 which are mounted in the lower rear ends of a U-shaped rear frame member 5. The tricycle also comprises a main frame member or backbone 10 which extends from the head 6 of the vehicle downwardly and rearwardly to a low horizontal central portion 11 and thence rearwardly and upwardly to a point of connection 12 with the rear frame member 5 and terminating at a higher elevation where the saddle is mounted. Disposed below the lower central portion 11 of the backbone and associated therewith and carried thereby to be described more fully below is the crank 13 and driving sprocket 14. The drive chain 15 passes over the driving sprocket 14 and the driven sprocket 16, see Figure 3, carried by the live axle 3 in the vertical median longitudinal plane of the vehicle and particularly the backbone member 10 thereof. The ends of the crank are provided with conventional pedals P actuatable in the conventional way by the rider of the vehicle.

Referring now to Figures 4, 5 and 6 the central drive comprises the driving sprocket 14 secured to and carried by the crank 13 in the center thereof preferably being located and received thereon in the longitudinal median plane of the backbone 10 by the flange 17 to which it is preferably welded or brazed; the upper portion of the sprocket and the adjacent parts of the chain 15 entering the interior of the backbone which is formed to be receptive thereof as by and through the elongated slot 18 thereby permitting a desirable proximity between the backbone and the axis of the crank, the latter being pivotally supported in the housing 20 which in turn is carried by the saddle 21 having a provision for longitudinal adjustment to control the tension in the chain 15.

The crank 13 preferably takes the form best shown in Figure 5 with integral arms and a central enlarged hub 22 having annular coaxial ball races 23 at its ends and with the flat face of a median flange 17 disposed half the thickness of the sprocket from the median transverse plane of the hub; the sprocket having a central aperture closely fitting the hub 22 and slidable thereover and over one of the arms of the crank prior to being anchored in place as by being welded to the face of the flange. Preliminary to assembling the housing 20 with its bearing cups or races 24 in respect to the crank and sprocket, ball bearings 25 with retainers are placed on the races 23 and thereafter the side plates 26 and 27 of the housing 20 in which the bearing cups or races 24 have been firmly fixed or pressed into the embossed portions 28 are passed up over the crank arms to approximately the positions shown in Figures 4 and 5, in the first instance more or less loosely engaging the bearings.

As shown especially in Figures 5 and 6 the side plates 26 and 27 have central apertures 29 within the embossed portions 28 through which the crank and crank arms freely pass. The plates also have aligned apertures 30 located approximately at their four corners and through which the reduced ends of spacing and securing spacers 31 extend. Spacers 31 are secured within apertures 30 by outwardly peening or riveting the reduced ends thereof whereby to accurately space apart and secure together plates 26 and 27. As shown especially in Figure 5 the spacers 31 have shoulders 32 adjacent their ends against which the inner faces of the plates adjacent the apertures bear. The distance between the shoulder on each of the spacers 31 is formed preferably with substantial accuracy wherewith to bring the bearing cups 24 into the desired proximity with the races 23 to give the desired pressure or clearance for the ball bearings 25 therebetween, and to secure the plates 26 and 27 in fixed parallelism and rigid assembly to each other and in relation to the axis of the crank and the said bearings. To this end the spacers 31 preferably take the form of thick walled hollow tubular structures; the thickness of the walls facilitating desirable width for the shoulders 32 and the tubular form of the spacers facilitating the outward flaring and/or hollow riveting of the reduced ends thereof over the chamfered surfaces 33 of the apertures 30 wherewith to enhance the security of the grip of the said reduced ends upon the plates 26 and 27 and to facilitate a flush external surface of the plates adjacent the apertures 30.

The housing 20 with the crank, sprocket and bearings operatively secured therein constitutes a sub-assembly separately removable from the vehicle and from operative relation to the frame thereof and one which may be conveniently adjustably secured in operative relation to the backbone through the saddle 21 as best shown in Figures 4 and 6. The detachability of this sub-assembly facilitates the threading of the chain over the driving sprocket and the longitudinal adjustability of the sub-assembly in respect to the saddle facilitates the adjustment of the tension in the chain.

As suggested above, the saddle 21, see Figures 4 and 6, carries the sub-assembly of housing, crank, etc., and the saddle is in turn carried by the lower, substantially straight horizontal portion 11 of the backbone. In its preferred form the saddle 21 takes the form in transverse section of a U-shaped channel having depending sides 35 and with the curve of the U snugly fitting the curve of the upper, substantially cylindrical half of the portion 11 of the backbone whereby to have a long and wide intimate reenforcing contact and engagement therewith. Preferably the saddle is substantially integrated with this portion of the backbone as by being brazed or welded thereto throughout some or all of the semi-cylindrical area of contact therebetween. Preferably the saddle is drawn of stock of gauge somewhat heavier than the backbone so that it lends a substantial measure of strength thereto when it is brazed or welded thereon to stiffen and strengthen the backbone throughout the region of the portion 11 thereof.

When, as we prefer, the plates 26 and 27 of the housing 20 are spaced apart an amount such that the distance between their outer surfaces is substantially equal to the outside diameter of the portion 11 of the backbone of the vehicle, the depending legs or sides 35 of the saddle 21 are planar and parallel whereby to closely and slidably receive the housing 20 and particularly the upper external portions thereof when the same is inserted therebetween as shown in Figures 4, 6 and 7. The depending sides 35 of the saddle 21 are provided with aligned elongated longitudinally extending apertures 36 at a level somewhat lower than the bottom of the backbone; the apertures 36 being spaced longitudinally approximately the same distance as are spaced the upper pair of apertures 30 and spacer 31 of the housing assembly 20. When the housing is inserted into the embrace of the saddle the holes through the spacers 31 are aligned with the elongated apertures 36 which preferably have the same vertical height as the inside diameter of the spacers 31 so that straight shanked bolts 37 passing through the spacers 31 and apertures 36 will squarely align the housing within the saddle and facilitate longitudinal movement therebetween for the length of the apertures 36. Nuts 38 on the bolts 37 facilitate clamping the housing between the legs of the saddle in the desired longitudinal position and in true alignment with the backbone and the median longitudinal plane of the vehicle and the rigid attachment thereto.

Preliminary to clamping the housing in the saddle it is convenient to pass the chain over the driving and driven sprockets and then prior to tightening up the nuts 37 and bolts 38 to urge the housing forwardly to bring the chain to a desirable state of tautness and then finally secure the housing by clamping the same in the saddle as mentioned above. When the housing is secured in the saddle, as shown in Figures 4 and 6, the upper portion of the driving sprocket and the adjacent rearwardly extending links of the chain lie within the backbone of the vehicle and are guarded thereby, being protected from being stepped upon by the rider and in turn being excluded from any possible contact with the hands, feet or garments of the rider of the vehicle. More particularly the most hazardous part of the mechanism, that is the point where the chain approaches and engages the driving sprocket, is out of sight and reach of the exploring fingers or toes of the children for whose use the vehicle is largely intended. The other exposed portions of the chain and the driven sprocket are guarded by novel means presently to be described.

As shown in Figures 4 and 6, the depending sides or legs of the saddle terminate in the mid-portions as at 39, high enough to clear the embossed portions 28 of the side plates 26 and 27 and to permit relative longitudinal motion of the embossed portions with the side plates throughout the whole adjustment afforded by the elongated slots 36. The forward and rearward portions 40 of the legs of the saddle extend downwardly and respectively forwardly and rearwardly, as shown in Figure 6, to approximately the level of the axis of the crank 13 and are provided with aligned apertures 41 which as will presently more fully appear, receive clamping means 42 for securing the chain and sprocket guard to this portion of the vehicle. It will be noted that the mid-portions of the ends of the housing plates 26 and 27 are cut back as at 43 at the level of the apertures 41 and means 42 wherewith to clear the latter when the housing is at either extreme position of longitudinal adjustment.

Referring now more particularly to Figures 1, 2, 3, 4, 7, 8 et seq. it will be seen that we have provided a symmetrically disposed and streamlined so-called chain guard 50 which, however, guards and completely encloses not only substantially all of the driving chain 15 but also all the driving mechanism excepting the crank arms and pedals and the lower portion of the rear sprocket 16. The guard in its entirety takes the form of a closed elongated rounded vessel or body preferably formed in two complementary mating halves of light but sturdy sheet metal stock preferably about .030 inch thick which when assembled in its working position, as shown in Figures 1 and 2, has its rounded forward end or nose disposed forwardly of the driving mechanism and its rounded tapered rearward end overlying the back step or platform 51 of the vehicle rearwardly of the rear axle of the driven sprocket; the guard having its greatest dimensions, see also Figures 4, 8 and 11, in the neighborhood of the axis of the crank and tapering and rounding smoothly fore and aft and up and down therefrom symmetrically with respect to the longitudinal median plane of the vehicle and the backbone thereof.

The right half 52 of the guard 50 is shown in Figures 8 to 14 inclusive. The left half 53 is an identical complement thereof excepting that the left half 53 has a socketlike brim 54, see Figures 3, 4 and 7, which, when the halves are assembled, snugly receives the straight male peripheral brim 55 of the right half 52 in a close externally inconspicuous fit giving the guard as a whole the appearance of a solid one piece body or vessel. Each of the halves of the guard has its upper portion adjacent the backbone notched where the backbone passes through the guard as at 56 and 57, see Figures 8 and 9, and as at 58 and 59, see Figures 1 and 2, to make a neat snug fit where the edge of the guard contacts the convex compound curve of the surface of the lower portion 11 of the backbone when the guard is assembled in relation thereto. The guard halves also have aligned circular apertures 60 through which the crank arms freely extend, the margins of which apertures however bear on the embossed portions 23 of the side plates of the housing 20 when the guard halves are drawn into snug engagement with each other (see Figures 4 and 5). To draw the halves together and secure them in their snug relationship with each other, the backbone and the said housing, we prefer to provide a pair of aligned apertures, of which those in the right half are indicated at 61 and 62, Figures 7 and 8. As shown in Figure 7 the aperture 63 of the left half which is aligned with the aperture 61 is shown in coaction with the clamping means 42 which draws the halves together in their assembled relation. The marginal edges of the apertures are preferably dished or countersunk inwardly to receive the tapered heads of screws 64 and 65 so that the external surfaces of the screws will be substantially flush with the external surface of the guard when the screws have been drawn home to their innermost clamping position. Preferably each of the screws 64 and 65 enter the opposite end of an internally threaded sleeve 66, the ends of which are reamed out at an angle corresponding to the tapered angle of the head of the screw wherewith to afford a snug fit for the tapered peripheral edges of the holes 61, 62, etc. Clamping the forward portion of the guard is simply done with a pair of clamping means 42 one positioned in front of and the other rearwardly of the housing 20.

The whole vessel comprising the guard 50 tapers rearwardly and each half thereof has a longitudinal slot 70, see Figures 1 and 8, which snugly receives the forwardly extending portion of the rear platform or step 51, see also Figure 2. Preferably the lower edge of the slot 70 terminates a little short of the rear axle 3 of the vehicle but the upper line 71 of the slot 70 continues straight to the extreme end of the guard through which it has continuous tight contact with the upper surface of the platform, see Figure 3; all the upper surfaces of the guard halves converging to a rounded rear terminal point as at 72 where the guard concludes its merger into the upper surface of the platform 51 at or adjacent the rearward edge thereof. Near the extreme rearward end of the guard each of the halves thereof has an inwardly turned tab 73 which lies flush upon the rear of the platform 51 and has an aperture which is aligned with the corresponding aperture in the platform when the guard halves are snugly assembled together and which by appropriate clamping means 74 secure the guard to the platform directly and inter alia secure the halves of the guard into their snug coacting relationship particularly throughout the rearward portions thereof. By terminating the lower portions of the guard halves short of the extreme rearward end thereof the clamping means 74 which may comprise mere sheet metal screws with their heads facing down and their threads biting the apertures in the tabs 73 are made readily accessible for attachment of the guard. It will be noted that we prefer that the depth of the slots 70 be such as to have a tight snug fit with the adjacent surfaces of the platform 51 whereby to enhance the appearance of the guard and the platform after the guard is assembled thereupon.

As suggested in Figure 1 and shown more fully in Figures 4, 6 and 7 the portion of the guard adjacent the saddle 21 has a tight continuous fit and bearing contact with the straight cylindrical upper portion of the saddle whereby to rest firmly thereupon and to permit the child using the vehicle to step on the guard above the crank to facilitate his mounting on and dismounting from the vehicle. The curving contour of the guard together with its support from and coaction with the frame, saddle, embossed portions 28 and rear platform 51 makes it appear integral with the whole of the vehicle and adds to its strength from the nature of its own structure and the relation to its parts with which it is associated so that it not only tends to contribute to the strength of the assembly but also has and receives strength from the assembly to withstand the user of the vehicle stepping upon it not only adjacent the crank but also adjacent the rear steps or wherever the child's foot might rest. Summarizing the guard is in effect a closed vessel completely protecting the child from all of the operating mechanism excepting the ends of the crank and pedal and literally from the exposed lower rear quadrant of the axle borne sprocket 16, which, however, is practically inaccessible and remote from any possible contact with or from the child.

While we have illustrated and described a preferred form and embodiment of our invention, modifications and changes will occur to those skilled in the art without substantially departing from the substance thereof and the precepts of this specification and therefore we do not care to be limited in the scope of our patent to the form herein specifically illustrated and described nor in any manner not required by the state of the prior art.

We claim:

1. In a tricycle having front and rear axles and a centrally disposed longitudinally extending hollow tubular frame member, a portion thereof lying near the plane of said axles and having a downwardly facing open recess, driving mechanism lying in part in said recess carried under said portion and symmetrically disposed in respect to the median longitudinal plane of said frame member, a chain connecting said mechanism and the said rear axle, and a chain guard comprising a substantially closed hollow vessel enclosing said mechanism, said portion, and said chain, and disposed symmetrically of said plane.

2. In a tricycle the combination of a backbone having a recess in the bottom of a portion thereof, a crank mounted below said portion, a sprocket secured to said crank and partially disposed in said recess, a housing rotatably supporting said crank and said sprocket, and a saddle overlying said portion of the backbone and supporting said housing.

3. In a tricycle the combination of a backbone having a slot in the bottom of a portion thereof, a crank mounted below said portion, a sprocket secured to said crank and partially disposed in said slot, a housing rotatably supporting said crank and said sprocket and a saddle overlying said portion of the backbone and embracing said housing for adjustable relative movement therebetween.

4. Driving mechanism comprising a hollow tubular frame member having a recess in its bottom, a saddle embracing said frame member and bonded thereto opposite said recess throughout a substantial portion of the length of said slot and having side portions depending therebelow, a crank supported by said saddle and disposed below said frame member with its axis transverse thereof, and a disc-like driving member carried by said crank and extending in part into said frame member through said slot.

5. For a chain driven vehicle the combination of a crank having an axis, a central hub portion coaxial of said axis, annular journals at opposite ends of said hub portion, and an annular flange intermediate said journals rising from said hub portion, a sprocket centered on said hub portion and secured to said flange, bearings having annular races associated with said journals respectively, a pair of plates longer than the diameter of said sprocket each having a central apertured embossed portion within which the races of said bearings are respectively disposed and through which said crank extends, and spacing and securing elements disposed on opposite sides of said axis at greater distances from said axis than the radius of said sprocket, said elements coacting with said plates for securing said plates together and spacing the same from each other and holding said bearings in operative relation to said journals and races.

6. For a chain driven vehicle the combination of a crank having an axis, a central hub portion coaxial of said axis, annular journals at opposite ends of said hub portion, and an annular flange intermediate said journals rising from said hub portion, a sprocket centered on said hub portion and secured to said flange, bearings having annular races associated with said journals respectively, a pair of plates longer than the diameter of said sprocket each having a central apertured embossed portion within which the races of said bearings are respectively disposed and through which said crank extends, said plates also having a plurality of aligned pairs of outwardly tapered apertures disposed on opposite sides of said axis at greater distances from said axis than the radius of said sprocket and shouldered spacing elements coacting with said plates adjacent said pairs of apertures respectively for securing said plates together and spacing the same from each other to hold said bearings in operative relation to said journals, said elements having reduced ends expanded within said apertures.

7. Driving mechanism for a tricycle having a centrally disposed longitudinally extending backbone having a depressed horizontally extending hollow tubular portion with a longitudinally extending downwardly facing slot therein, a crank with its axis disposed below said portion, a driving sprocket carried by said crank in vertical alignment with said slot and passing through said slot with its upper part disposed in said hollow tubular portion, a bearing supporting housing with bearings in which said crank is rotatably supported comprising spaced plates, portions of whose outer surfaces are respectively and symmetrically spaced from the median longitudinal plane of said backbone, a saddle of inverted U-shaped cross-section secured to said backbone portion with its sides depending therebelow and slidably receiving said housing, and clamping means securing said housing between the side plates of said saddle.

8. In a tricycle a curved centrally disposed longitudinally extending backbone having a depressed horizontally extending hollow tubular portion with a longitudinally extending downwardly facing slot therein, a crank with its axis disposed below said portion, a driving sprocket carried by said crank in vertical alignment with said slot and passing through said slot with its upper part lying in said hollow tubular portion, a chain carried by said sprocket and passing through said slot, a bearing supporting housing with bearings in which said crank is rotatably supported comprising plate portions of whose outer surfaces are respectively and symmetrically spaced from the median longitudinal plane of said backbone and parts of which are embossed outwardly to receive said bearings, a saddle of inverted U-shaped cross-section overlying and secured to said backbone portion with its sides depending therebelow and slidably receiving said housing, means for gripping said housing between the side plates of said saddle, a chain guard comprising a pair of halves joined in the plane of said backbone and notched to receive said backbone portion and apertured for said crank and encompassing said saddle and housing, and means carried by said saddle for drawing said halves together with the parts thereof adjacent said crank apertures snugly contacting the embossed bearing supporting parts of said plate.

9. In a chain driven vehicle, a crank, a driving sprocket carried thereby, a crank bearing housing comprising spaced plates carrying bearings rotatably supporting said crank and having parts normal to the axis of said crank, hollow rivets spacing and joining said parts, a frame element extending transversely of said crank, a channel shaped member straddling said frame element and secured thereto with its side walls extending therebeyond and slidably receiving said parts of said housing and having elongated slots of width approximately equal to the internal diameter of said rivets, clamp bolts fitting and extending through said slots and said rivets and nuts coacting with said bolts.

10. A tricycle having a backbone in the median longitudinal plane thereof, driving mechanism including a crank and sprocket disposed below a mid-portion of said backbone, a driven axle spaced from said mechanism having a driven sprocket, a chain connecting said sprockets, a platform lying above said axle with parts adjacent said driven sprocket, a vessel enclosing said portion of the backbone, driving mechanism, chain and driving sprocket and having a portion overlying said platform and driven sprocket and secured to said platform.

11. A tricycle having a backbone in the median longitudinal plane thereof, driving mechanism including a crank and sprocket disposed below a mid-portion of said backbone with the sprocket lying substantially in said plane, a driven axle spaced from said mechanism having a driven sprocket in said plane, a chain connecting said sprockets, a platform lying above said axle with an aperture for said driven sprocket, a vessel enclosing said portion of the backbone, driving mechanism, chain and sprocket and having an integral portion overlying said platform and driven sprocket and secured to said platform, said vessel comprising longitudinally extending complementary halves meeting substantially in said plane and apertured adjacent said crank and notched at the ends of said backbone portion to closely fit the latter and having notches receiving a part of said platform.

12. In a tricycle the combination of a backbone having a lower longitudinally extending portion comprising a downwardly opening channel with spaced parallel sides, a driving mechanism carried by said portions comprising a crank, a driving sprocket centrally secured to said crank and disposed in the plane of said backbone and extending into said channel, a bearing housing rotatably supporting said crank and carried by said channel between the sides thereof, clamping means for fastening said housing to said channel, said channel being slotted to receive said means and to permit said housing to be adjustably movable longitudinally of said channel.

13. In a tricycle the combination of a backbone comprising a lower longitudinally extending saddle having spaced parallel depending sides, a driving mechanism carried by said saddle comprising a crank having an axis, a driving sprocket secured to said crank and disposed in the plane of said backbone and extending into said saddle, a bearing housing rotatably supporting said crank and disposed between the said parallel depending sides of said saddle, said housing comprising parallel fixedly spaced plates disposed normal to said crank axis on opposite sides of said sprocket and in slidable contact with the said parallel depending sides of said saddle.

14. The combination of claim 13 with outwardly embossed bearing portions on the plates of said bearing housing, the sides of said saddle at the forward and rear ends thereof extending down substantially to the level of the crank axis and being cut away intermediate said ends to clear said embossed portions and to permit sliding movement of said bearing housing relative to said saddle.

15. The combination of claim 14 in which said bearing housing plates are longer than the diameter of said sprocket, means for securing said plates together and spacing same comprising spacing and securing elements disposed on opposite sides of the axis of said crank at greater distance from said axis than the radius of said sprocket.

16. The combination of claim 13 with spaced journals on said crank, bearings having annular races associated with said journals respectively, said bearing housing plates each having a central apertured embossed portion within which the races of said bearings are respectively disposed and through which the crank extends, the sides of said saddle proximate said embossed portions and said crank being cut away to permit sliding movement between the bearing housing and the saddle.

17. In a tricycle the combination of a longitudinally extending backbone having a lower portion comprising a saddle having spaced parallel depending sides, having slotted openings therein, a crank having an axis, spaced journals on said crank, a drive sprocket secured to said crank intermediate said journals, bearings associated with said journals, a bearing housing for supporting said crank comprising a pair of fixedly spaced plates slidably disposed between the sides of said saddle and each having a centrally apertured embossed part in which said bearings are disposed and through which said crank extends, and clamping means carried by said housing engaging the slotted openings in said saddle to permit longitudinal adjustment of the bearing housing relative to the saddle.

18. The combination according to claim 17 in which said plates are greater in length than the diameter of said sprocket, spacing and securing elements on opposite sides of said axis at greater distances from said axis than the radius of the sprocket coacting with said plates respectively for securing said plates together and spacing same from each other to hold the bearings in operative relation to said journals, the sides of the saddle having the front and rear end portions extending down substantially to the level of the crank axis and portions intermediate said ends cut away to clear the embossed parts of the bearing housing.

WILLIAM C. ROE.
ROBERT G. NIGHTINGALE.

REFERENCES CITED

The following references are of record in the file of this patent:

UNITED STATES PATENTS

| Number | Name | Date |
| --- | --- | --- |
| 442,871 | Edwards | Dec. 16, 1890 |
| 594,694 | Humphrey | Nov. 30, 1897 |
| 600,001 | Harris | Mar. 1, 1898 |
| 633,534 | Read | Sept. 19, 1899 |
| 1,623,400 | Englund | Apr. 5, 1927 |
| 1,856,255 | Johnson | May 3, 1932 |

FOREIGN PATENTS

| Number | Country | Date |
| --- | --- | --- |
| 585,903 | Great Britain | Feb. 27, 1947 |